Patented Feb. 20, 1951

2,542,773

UNITED STATES PATENT OFFICE 2,542,773

METHOD OF SYNTHESIZING 16-KETO-STEROIDS

Max N. Huffman, Dallas, Tex., assignor to G. D. Searle & Co., Chicago, Ill., a corporation of Illinois No Drawing. Application January 7, 1948, Serial No. 1,057

14 Claims. (Cl. 260—397.4)

This invention relates to synthesis of cyclopentanoperhydrophenanthrene derivatives, and especially to estrogens and androgens having a steroid nucleus.

I have found that utility may be derived from stroids or cyclopentanoperhydrophenanthrene derivatives having a functional carbonyl or keto group on the C16 position. Particular importance is directed to the 16-keto estrogenic and androgenic hormones having physiological activity which may be used to supplement, inhibit, or replace the natural or abnormal glandular secretions of hormones.

16-keto-steroids having androgenic or estrogenic characteristics have not been isolated as naturally occurring substances or even as intermediates in the normal metabolic functions of animal and plant life. Thus, their production, for the present, is reliant on partial synthesis from other steroid compounds which may be obtained from natural or artificial sources, as by organic synthesis. From a practical standpoint, sufficient quantities of the 16-keto-steroid derivatives have not been made available to establish all of their beneficial characteristics or to enable their full utilization in tested clinical treatments. Failure to produce larger quantities of the desired compounds may be attributed to many factors which existed heretofore. In the first place, the cost of the parent material is high. This coupled with the fact that prior syntheses were complex and the yield of sufficiently pure product quite low made the cost of the final product excessive. As a result, proper classification and use of steoroids having a functional oxygen on the C16 position was impaired. In prior reactions for fabricating steroid derivatives, especially estrogens, it was necessary to provide a protective group for the functional hydroxy group when present on the C3 position of the phenolic portion of the molecule, which group often is regenerated as part of the final step of the synthesis. This further complicated the various processes, lowering their yield and raising their cost.

It is an object of this invention to provide a process for synthesizing a functional carbonyl group on the C16 position of a steroid nucleus.

Another object is to provide a method for substituting a keto group for an oximino group on the C16 position of the parent steroid nucleus.

A further object is to provide a method for synthesizing 16-keto-steroid derivatives in a simple and economical manner from which crystals in excellent quantitative yield are obtained in purified form.

A still further object is to provide a method for synthesizing a carbonyl group on the C16 position of a steroid nucleus without the necessity of providing a protective group on the functionally active C3 position.

A still further object is to produce a method for synthesizing hormones having estrogenic and endrogenic characteristics with a functional keto group on each of the C16 and C17 positions.

Another object is to produce a method for manufacturing 16-keto-steroid derivatives from corresponding 16-oximino-steroid derivatives and for refining the product to obtain the same in pure crystalline form which may be readily adapted for clinical use.

In accordance with this invention, the 16-oximino group of the parent steroid nucleus is replaced by chemical reaction with a functional carbonyl group, such as a keto group. I effect the replacement by reacting 16-oximino-steroid (16-isonitroso-steroid) (I) with a bisulfite to form the bisulfite derivative, hereinafter referred to as the steroid isonitroso-bisulfite (II).

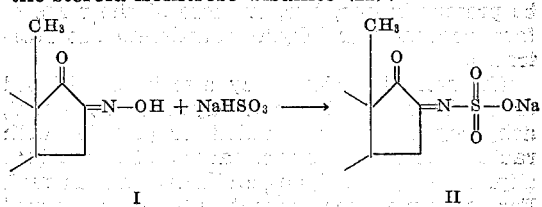

When the steroid isonitroso-bisulfite is hydrolized, as by reaction with an acid, a keto group is substituted for the isonitroso-bisulfite group to produce the corresponding 16-keto-steroid derivative (III).

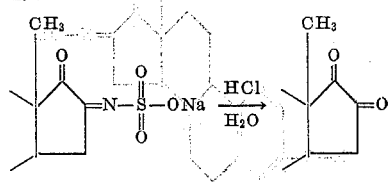

There are many methods by which suitable parent 16-oximino-steroid derivatives may be prepared. One of these is described by Litvan and Robinson in the "Journal of Chemical Society," page 1997, published in 1938. By the described method, 16-oximino estrone-3-methyl ether (IV)

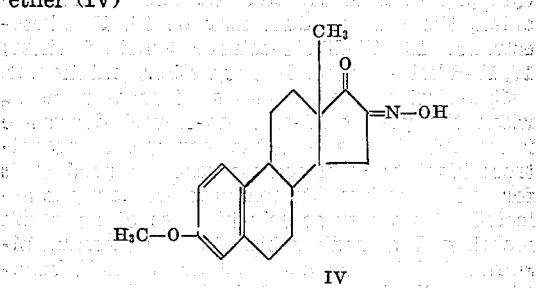

was prepared by the reaction of estrone-3-methyl ether with isoamyl nitrite in the medium of t-butyl alcohol and potassium t-butoxide. This method has particular utility in the nitrozation of steroid compounds having a keto group already on the C17 position. Thus, the described process may be used to advantage for the preparation of parent material for the synthesis of 16-keto estrogens and androgens having hormone activity. Illustrative of the estrogenic compounds having a 17-keto group and capable of reaction by the described method to provide corresponding 16-oximino derivatives are estrone (3 - hydroxy - 17 - keto - $\Delta^{1,3,5}$-estratriene), equilenin (3-hydroxy-17-keto-$\Delta^{1,3,5,6,8}$-estrapentaene), equilin (3 - hydroxy - 17 - keto-$\Delta^{1,3,5,7}$-estratetraene). Suitable androgenic compounds include androsterone (3($\alpha$)-hydroxy-17-keto-androstane), dehydroandrosterone (3($\alpha$)-hydroxy-17-keto-$\Delta^5$-etioallocholene), androstenedione (3-17-diketo-etioallocholene), and the like.

Practice of my invention is not confined to steroid derivatives originally having a keto group in the C17 position, but it may be carried out with any 16-oximinosteroid derivative regardless of the functionality of the C17 position. Nor is the process limited by the construction of the steroid nucleus because, as illustrated in the above specific compounds, the desired reactions may be secured whether it is saturated or unsaturated. When unsaturated, it may be unsaturated in the A ring, B ring, C ring, or in the cyclic D ring, or in any combination or in all of the rings. More than one unsaturated group may be present in one, two, or more of the rings to form benzenoid or dehydro constituents, as illustrated.

The steroid nucleus may also be substituted or unsubstituted; that is, it may be hydrogenated, dehydrogenated, halogenated, or provided with radicals of the aliphatic, carbocyclic, or mixed aliphatic-aromatic types, and derivatives thereof. For example, the parent 16-oximino-steroid when based on an estrogenic nucleus may have the following formula:

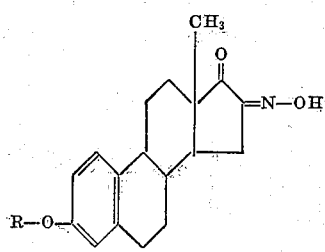

where R is either hydrogen or an organic radical of the type aliphatic, alicyclic, aromatic, aliphatic-aromatic, or heterocyclic, and derivatives thereof. The aliphatic portions may further be branched or straight chained, saturated or unsaturated, substituted or unsubstituted. R may be ethyl, methyl, benzyl, allyl, styrol, phenyl, cyclopentyl, isoamyl, and the like. When reacted, the final product may be 16, 17-diketo-estrone; 16, 17-diketo-estrone-3-methyl ether; 16,17-diketo-estrone-3-benzyl ether, and the like.

Considering the syntheses of greater detail, when the parent 16-oximino-steroid derivative is reacted with bisulfite, the corresponding isonitroso-bisulfite intermediate reaction product is formed. The bisulfite reactant ordinarily is selected of a water soluble bisulfite of an alkali metal, such as sodium bisulfite or potassium bisulfite, but it may also include the acid bisulfites and the bisulfites of other metals.

It is advantageous to carry out the reaction in solvent medium for which the low molecular weight organic carboxylic acids of the type acetic, propionic, butyric, and the like may be used. Best use is made of acetic acid, especially glacial acetic acid, and when such acids are used, the bisulfite may be wholly or partially replaced with alkali metal sulfites, such as sodium sulfite, potassium sulfite, and ammonium sulfite. Although satisfactory yield of the reaction product may be secured by the use of theoretical amounts of parent material and bisulfite, a higher yield of the more desirable steroid reaction product is secured when a large excess of the bisulfite is present. Often the materials are present in a molecular ratio as high as 15 of the bisulfite reactant to 1 of the steroid, but more often, the ratio is about 5 to 10 of the bisulfite to 1 of the steroid. The reaction may be catalyzed by heating to a temperature below 95° C., and the end point of the reaction is indicated by the deceleration of released gases. Ordinarily, the bisulfite reaction may take from 10 to 35 minutes or even longer depending upon the agitation, temperature, and the ratio of materials employed, as well as the reactivity of the parent steroid nucleus as determined by its size and arrangement.

When the isonitroso-bisulfite reaction product is acidified in aqueous solution, the isonitroso-bisulfite group is replaced by a carbonyl or keto group, the acidification reaction being in the form of an hydrolysis. Although acidification may be effected by most of the ordinary acidifying substances, such as acids and acid salts in solution, best results are obtained from the use of mineral acids, such as hydrochloric acid, sulphuric acid, and phosphoric acid, preferably in a concentrated form. The reaction rate and yield are aided by the use of elevated temperatures and agitation. The final yellow cyrstalline product is obtained in excellent quantitative yield from the acidic medium. The product may be further purified by washing or in a manner hereinafter described.

The bisulfite reaction is aided if, after the initial reaction, a small amount of water is added and then heated below 95° C. with mixing for an additional period of time. The resulting aqueous phase which contains the desired steroid reaction product is clear and may be separated from the remainder by ordinary separating means, such as by decantation or by the use of a separatory funnel. To insure maximum recovery of the intermediate reaction product, an additional quantity of bisulfite in dilute aqueous solution (3 percent concentration) may be added to the materials prior to their phase separation. Before or after separation, impurities may be extracted from the aqueous phase by suitable organic solvents, and when this is done, it is best to treat the separated solvent phase with additional sodium bisulfite to recapture any of the isonitroso-bisulfite or 16-keto-steroid compounds which may have been formed and extracted with the solvent. More than one bisulfite treatment of the extract may be used to insure maximum recovery of the expensive steroid derivatives. Ethyl ether (preferably alcohol and peroxide free) may be used as the extracting solvent or other solvents of the type benzene, ethers, and chlorinated hydrocarbons may be used, preferably with boiling points below 100° C.

When it is desired to secure the 16-keto-steroid derivative in fine crystalline form, water soluble salts, such as sodium chloride, potassium chloride, and the like, may be added to the solution. These salts operate to "salt out" the solution during the crystallization of the yellow 16-keto-steroid derivative.

The end product may be additionally purified by reaction with bisulfite to form carbonyl-bisulfite addition compounds, which may then be regenerated by hydrolyzation.

The following specific examples of my invention are given by way of illustration but not by way of limitation:

EXAMPLE I

*The preparation of 16-keto-estrone-3-methyl ether from 16-oximino-estrone-3-methyl ether*

600 mg. of 16-oximino-estrone-3-methyl ether and 6 grams of anhydrous sodium sulfite are combined. The mixture is covered with about 24 cc. of acetic acid and heated to about 90° C. on a steam bath until the evolution of gas has practically ceased. To this mixture, 6 cc. of water are added and the reaction is continued for about 45 minutes with heating. The contents when cooled are transferred to a separatory funnel containing about 250 cc. of 3 percent sodium bisulfite and 200 cc. of ethyl ether (preferably alcohol and peroxide free). After thorough agitation, the clear aqueous phase is separated and the ethereal phase is further extracted with successive portions of dilute bisulfite to insure the recovery of the intermediate steroid reaction product and any 16-keto compounds that may be directly formed. The combined aqueous bisulfite fractions are acidified with about 60 cc. of concentrated hydrochloric acid and then heated on a steam bath for about 30 minutes with frequent agitation. Pale orange crystals slowly separate from the acidified solution during exposure at reduced temperatures. These crystals may be filtered from the solution, washed, and dried in vacuo. When purification is desired, the crystals may be treated with sulfites or bisulfites to form bisulfite addition compounds and then regenerated by hydrolysis to tiny yellow crystals which comprise a purer product.

EXAMPLE II

*The preparation of 16-keto-estrone from 16-oximino-estrone*

To 500 mg. of 16-oximino-estrone and 5 grams of anhydrous sodium sulfite, 20 cc. of acetic acid are added. The mixture is heated on a steam bath for about 15 minutes with frequent stirring and then diluted with about 5 cc. of water. Heating is continued for about 45 minutes with frequent agitation after the water addition. After cooling to room temperature, the mixture is transferred to a separatory funnel with the aid of about 200 cc. of 3 percent sodium bisulfite. The clear aqueous phase is shaken with 250 cc. of (peroxide-free) ethyl ether and separated. The ether phase is extracted further with additional portions of 3 percent sodium bisulfite. To the combined bisulfite phases, about 30 cc. of concentrated hydrochloric acid and a few small chips of porous plate are added. The acidified solution is heated on a steam bath with almost continuous swirling until ebullition from the porous stones has ceased. Thereafter, 50 grams of sodium chloride are added and heated continuously for about 15 minutes with frequent swirling. Crystals of 16-keto-estrone are slowly formed after the mixture is allowed to cool to room temperature. The crystals are separated by filtration, copiously washed with water, and then dried. The final product is pale yellow crystals of microscopic nature decomposing at 234 to 238° C., and the yield of product is in the range of 60 to 80% as calculated on the basis of the parent 16-oximino-estrone.

My invention is primarily directed to a new and improved method for synthesizing a functional carbonyl group on the C16 position of steroid derivatives. A cardinal feature of the invention resides in the simplicity and relatively few steps which are involved in the synthesis and the high yield of crystalline product which is ultimately obtained. Another feature of this invention is to be found in the ability to carry out the reactions without interference of or interfering with the functional group on the C3 position.

It will be understood that the reactions are not limited by the specific compounds named but that others capable of reacting with the oximino group to form a compound capable of replacement with a keto group are suitable. It is not controlling whether hydrolization be performed by the described acids or other acids. Other changes in the methods of handling and equipment may be made within the scope of the invention, especially as defined in the following claims.

What is claimed is:

1. The process for the manufacture of 16-keto steroid compounds comprising reacting the corresponding 16-oximino-steroid with bisulfite dissolved in organic carboxylic acids, and subsequently reacting the bisulfite intermediate reaction product with mineral acids to substitute a keto group on the C16 position.

2. The process for the synthesis of 16-keto-steroid derivatives comprising reacting the corresponding 16-oximino-steroid with an excess of a material selected from the group of alkali metal sulfites and alkali metal bisulfites in acetic acid solution, and subsequently hydrolyzing a keto group on the C16 position of the steroid derivative.

3. The process for the manufacture of 16-keto-steroid derivatives of estrogenic and androgenic characteristics comprising heating the corresponding 16-oximino-steroid derivative in the presence of an excess of material calculated theoretically to react with the oximino derivative and selected from the group consisting of alkali metal sulfites and alkali metal bisulfites in solution with organic acids of low molecular weight, heating further with the addition of water, separating the aqueous phase containing the oximino-bisulfite reaction product on the steroid nucleus, and subsequently causing a keto group to replace the oximino-bisulfite group by hydrolyzation in the presence of mineral acids.

4. The process, as claimed in claim 3, in which the bisulfite reaction is carried at below 95° C. until the evolution of gases has greatly decelerated.

5. The process, as claimed in claim 3, in which an organic solvent, immiscible with the aqueous phase and capable of dissolving the other phase, is admixed with the reaction product prior to separation of the aqueous phase.

6. The process, as claimed in claim 5, in which the other separated phase containing the solvent is extracted with dilute aqueous bisulfite solution to insure the recovery of steroid reaction products.

7. The process, as claimed in claim 5, in which the extracting solvent is peroxide-free and alcohol-free ethyl ether.

8. The process, as claimed in claim 3, in which the hydrolyzation for causing the keto group to replace the oximino-bisulfite group is carried out at elevated temperatures in the presence of concentrated hydrochloric acid, until the ebullition of gas ceases.

9. The process, as claimed in claim 8, in which the hydrolyzation is carried out in solution strongly concentrated with alkali halide salts.

10. The process for the synthesis of 16-keto estrone derivative, comprising forming oximino-bisulfite intermediate reaction products of 16-oximino-estrone derivatives having the formula

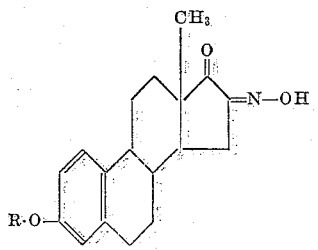

where R is selected from the group of monovalent substances consisting of hydrogen, and a monovalent organic radical, by reaction of the 16-oximino estrone derivative with a compound selected from the group consisting of alkali metal sulfites and alkali metal bisulfites dissolved in organic carboxyl acids, and hydrolyzing the intermediate reaction product to substitute a keto group for the oximino-bisulfite group.

11. The process for synthesizing 16-keto androsterone and derivatives thereof comprising forming the bisulfite intermediate reaction product of 16-oximino androsterone derivatives having the formula

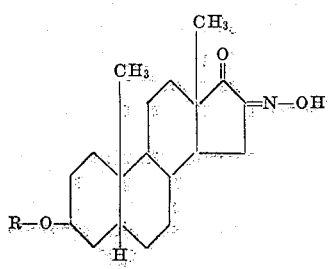

where R is selected from the group of monovalent substances consisting of hydrogen, and a monovalent organic radical, by reaction of the 16-oximino estrone derivative with a compound selected from the group consisting of alkali metal sulfites and alkali metal bisulfites dissolved in organic carboxyl acids, and hydrolyzing the intermediate reaction product to substitute a keto group for the oximino-bisulfite group.

12. The process for the manufacture of 16-keto-steroid derivatives of estrogenic and androgenic characteristics comprising heating the corresponding 16-oximino steroid derivative at a temperature below 95° C. with 5–10 times the theoretical reactive proportion of a material selected from the group consisting of alkali metal sulphites and alkali metal bisulphites in solution with a low molecular weight carbonylic acid until there is a deceleration in the release of gases, and then acidifying the reaction product in aqueous medium by the addition of a concentrate mineral acid selected from the group consisting of hydrochloric acid, sulphuric acid, and phosphoric acid.

13. The process for the manufacture of 16-keto-steroid compounds comprising reacting the 16-oximino-steroid with an alkali metal bisulfite in a low organic acid, hydrolizing the bisulfite intermediate reaction product in acidic medium to substitute a ketone group in the C16 position.

14. The process for manufacturing 16-keto-steroid compounds comprising reacting the corresponding 16-oximino-steroid with an alkali metal sulfite in a low organic acid and hydrolizing the sulfite intermediate reaction product in acidic medium to substitute a ketone group in the C16 position.

MAX N. HUFFMAN.

REFERENCES CITED

The following references are of record in the file of this patent:

UNITED STATES PATENTS

| Number | Name | Date |
|---|---|---|
| 2,062,904 | Hartmann | Dec. 1, 1936 |
| 2,208,942 | Kaiser | July 23, 1940 |